June 26, 1962     A. A. LORENZ     3,040,582

MOTION TRANSMISSION MECHANISMS

Filed Nov. 26, 1958

INVENTOR.
ALAN A. LORENZ
BY *Grover A. Frater*
ATTORNEY

United States Patent Office 3,040,582
Patented June 26, 1962

3,040,582
MOTION TRANSMISSION MECHANISMS
Alan A. Lorenz, Davenport, Iowa, assignor to The Bendix Corporation, a corporation of Delaware
Filed Nov. 26, 1958, Ser. No. 776,492
3 Claims. (Cl. 73—386)

This invention relates to motion transmission mechanisms. An object of the invention is to provide an improved motion transmission system mechanism for calibrating system motion or compensating for motion changes incident to temperature change or both.

Instrument makers, especially, must provide a means intermediate a condition sensing element and the indication display element for initially calibrating instruments with respect to a zero or reference indication and with respect to range. Often, means must also be provided for compensating to prevent errors in reference indication and range resulting for dimensional changes and sensing element sensitivity incident to temperature change. An object of the invention is to provide a single mechanism for calibration and compensation whereby to simplify this operation both in manufacture and readjustment of instruments.

Another object is to provide an inexpensive and reliable adjustment means for instruments.

Certain of these objects are realized in the invention by the provision, of a bimetal element whose position relative to other elements in a motion transmission system may be adjusted in a variety of directions individually or in unison to alter the mechanical advantage of the system.

Another object is to provide means for simultaneously compensating for changes in zero-set and range resulting from temperature change.

One embodiment of the invention is illustrated in the accompanying drawing and is hereinafter described, it being understood that various modifications may be made in the embodiment of the invention shown and that other embodiments of the invention may be made without departing from the scope and spirit of the appended claims.

Figure 1:
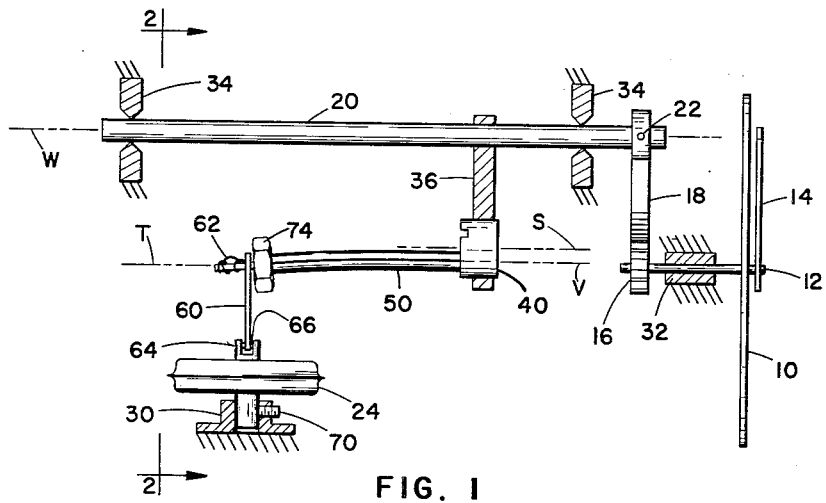
FIG. 1 is a schematic, side view of an instrument mechanism in which the invention is embodied.

Referring to FIG. 1 by reference numerals, there is shown a basic pressure indicator mechanism, such as employed in an altimeter, comprising an instrument dial 10 provided with an opening through which extends a pointer shaft 12. A pointer 14 at one end of shaft 12 rotates relative to dial 10 when gear 16, fixed to the other end of shaft 12, is rotated by a sector gear 18. The latter is fixed to a rock shaft 20 by a set screw 22.

Means are provided for rotating rocking shaft 20 in accordance with expansion and contraction of a sealed expansible capsule 24 incident to changes in ambient pressure together with means for calibrating and temperature compensating rocking shaft rotation. The lower side of capsule 24 is fixed at 30 to the instrument case and the axes of rotation of shafts 12 and 20 are also fixed relative to the case because their respective bearings 32 and 34 are fixed to the case.

This means advantageously comprises a motion transmitting element or arm 36, a bimetallic element 50 and means for mounting the bimetallic element on the arm, as shown. The arm 36 has an opening at one end by which it is assembled or rocking shaft 20 and there held by a set screw 38 so that the arm is rotatable with the rock shaft about the axis W of the latter. At its other end, arm 36 has an opening in which is fitted a cylindrical mounting member 40 having a kerf 42 formed in one end to facilitate its rotation, about its axis S, relative to arm 36.

The axis S is substantially parallel to axis W of the rocking shaft 20 and substantially parallel to both S and W is the rotational axis V of a bimetallic element 50. Axis V lies substantially in the plane in which the bimetal 50 bends in response to a change in temperature.

Figure 4:
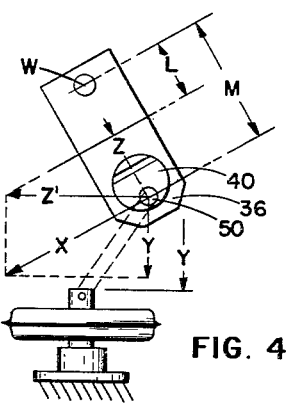
FIG. 4 is a diagram illustrating operation of the invention.

The bimetal element 50 is advantageously formed of elongated strips 52 and 54 of Invar and copper, respectively, joined together and formed as a rod, as best shown in FIG. 4. One end of element 50 is press fitted into an opening 152 in mounting member 40. At its other end, bimetallic element 50 terminates in a hex-shaped enlargement 74 by which the whole of the element may be rotated relative to mounting member 40. Opening 152 is formed at one side of the axis of rotation of member 40 whereby the bimetallic element is eccentrically mounted on member 40.

Additionally, said opposite end of bimetal element 50 is provided with an axial projection 56 of reduced diameter. A link 60 extends from projection 56, where it is held in place by a clip spring 62, to a connection 64 at the upper side of capsule 24 to which it is connected by a pivot pin 66. The line of axis T extends through the point of connection of the link 60, and projection 56 is the axis of relative motion therebetween.

Figure 2:
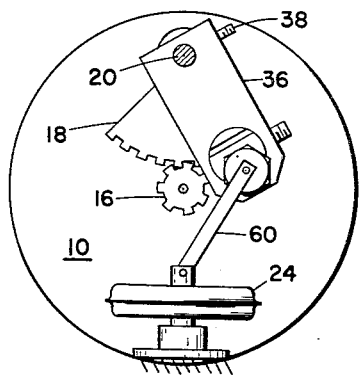
FIG. 2 is a schematic end view of the mechanism shown in FIG. 1.
Figure 3:
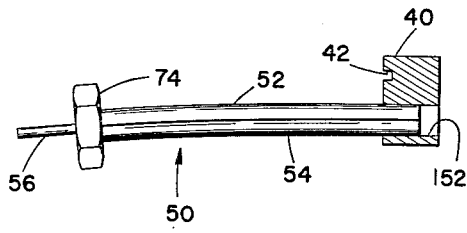
FIG. 3 is a view of the bimetallic element and mounting member of FIG. 1, the mounting member being shown in central section.

When ambient pressure decreases, capsule 24 expands, driving link 60 to apply a force to bimetal element 50, at projection 56, which force is transmitted to arm 36 driving the latter counter clockwise, in FIG. 2, thus rotating rocking shaft 20. Rotation of the rocking shaft rotates sector gear 18, gear 16, shaft 12 and pointer 14.

Neglecting temperature variation, for a given degree of expansion of capsule 24, pointer 14 is required to undergo a degree of rotation corresponding to the scale of the indicia on the instrument dial 10. The pointer rotates with shaft 20 whose axis is W and movement of capsule 24 is applied to the motion transmission arm 36 at axis T at the outer end of bimetallic element 50. Thus to change the ratio of pointer rotation to expansible element expansion, it is only necessary to change the separation of axes W and T. This is accomplished by rotation of mounting member 40 as by a screw-driver inserted in kerf 42. This arrangement does not complicate the zero or reference setting of the pointer because the dial 10 need only be rotated relative to the mechanism and pointer until the correct indicia appears under the pointer.

Suppose next that the instrument is subjected to lowered temperature. The parts of the instrument may change in dimension and, the sensitivity of the condition sensing capsule 24 may be altered so that correspondence between expansion of element 24 and pointer position will be lost with respect to both reference setting and range.

The invention and the illustrated embodiment thereof are entirely capable to compensate for these changes regardless of their algebraic sign or degree.

For example, in the drawing, if the temperature is lowered without a change in pressure, capsule 24 will contract slightly and the pointer will move to indicate a different pressure. In addition, the spring rate or stiffness of the capsule (when constructed of the commonly employed materials such as beryllium copper) will increase so that pointer 14 will not rotate sufficiently in response to a given pressure change.

Examining these effects of cold in greater detail, a contration of expansible capsule 24 results in downward displacement of link 60 and consequent clockwise rotation of arm 36 and rotation of pointer 14. To correct this effect of reduced temperature, it is necessary to increase the separation, in the direction of element contraction, of pivot pin 64 and the line of attachment V of bimetallic element 50 to arm 36 by an amount equal to the contraction of expansible element 24. An increase in the spring rate of that element with reduced temperature results in reduced incremental expansion with an incremental change in pressure. To maintain the correct relation between incremental rotation of rocking shaft 20 and incremental pressure change, the effective length of lever arm 36 must be decreased, that is, the separation of axes W and T must be decreased.

Bimetallic element 50 will bend in one plane in proportion to temperature change to change the separation of axis T and line V in that plane.

For any instrument the ratio of the magnitude of the required increased separation of V and T in the direction of contraction of element 24 whereby to correct pointer setting error resulting from temperature decrease of the magnitude of the required increased separation of V and T to accomplish the required decreased separation of W and T, whereby to correct range errors introduced by that same temperature change, is a fixed ratio. Since bimetallic element 50 bends in one plane, it can be rotated about axis V so that the components of its bending motion in each of the required directions have relative magnitude in the required ratio.

The amount of bending in bimetallic element 50 is further determined by its length which is the separation between its point of emergence from opening 152 and its point of attachment, at axis T, to link 60. By withdrawing the bimetallic element 50 from opening 152 more or less, but without rotating it so that the ratio of motion components is not changed, the magnitude of the temperature compensation motion components can be increased and decreased until correct.

Operation of the invention in the embodiment selected for illustration is diagrammed in FIG. 4 wherein it is assumed that the expansible element 24 has contracted a distance Y as a result of temperature reduction, necessitating downward displacement of axis T through distance Y, and that its spring rate has increased whereby the effective length of arm 36 must be decreased from M to L, a distance Z. Translating vector Z into Z' at right angles to Y, drawing the vectors Y and Z' from axis T, and adding them vectorially defines vector X. Thus if member 40 is held against rotation and bimetallic element 50 is rotated so that its bending plane coincides with vector X, then upon a temperature change the bimetallic element 50 will bend so that the Y and Z' components of its bending are in the proper ratio and it remains only to adjust insertion of the bimetal in opening 152 until the magnitude of the X vector is correct whereby the Y and Z' vectors are also correct.

In this adjustment member 40 is not rotated so that the zero set and range calibration initially made are not disturbed. Moreover, the instrument may be recalibrated without disturbing the temperature compensation by holding the bimetallic element to prevent rotation relative to the instrument frame or case while rotating member 40.

The expansible element 24 is intended to represent various forms of sensing elements with which the invention may be employed. If such an element is employed, as in an altimeter, means are employed by which the position of the element may be adjusted relative to the case so that the angle of application of expansible element motion to the motion transmission mechanism may be adjusted. In the drawing, the numeral 30 and set screw 70 represent such means. They permit adjustment of the angle of action of link 60.

In the embodiment illustrated the calibration and compensation mechanism comprises the bimetallic element, mounting member and transmission element arranged in series in that order. This form is especially advantageous and is now preferred, but persons skilled in the art will recognize that the order of these elements may be changed. Thus the mounting element may be interposed between the arm and the rocking shaft the latter being eccentrically mounted, relative to the axis of mounting element in opening 152. Moreover, where bimetallic element movement is small as it is in most instruments, the mounting member may be interposed between the bimetal and its driving link so that these elements are eccentrically connected to the mounting member.

I claim:

1. A motion transmitting mechanism comprising, a rotatable shaft, a lever rotatable about the shaft axis, a bimetallic element responsive to temperature change to bend in a plane and rotatbaly mounted relative to said lever on an axis in said plane and parallel to and spaced from said lever axis, and a mounting member carried by said lever and rotatable relative to said lever and bimetallic element on an axis parallel to and separated from said shaft and bimetallic axes, one of said shaft and bimetallic elements being mounted on said mounting member and the other being mounted on said lever.

2. A motion transmitting member for interposition between a rotatable shaft and a driver comprising: an arm rotatable with the shaft about the shaft axis; a bimetallic element responsive to temperature change to bend in a plane; said bimetallic element being connected to said arm and rotatable relatively thereto on an axis extending through said plane and parallel to said shaft axis; said bimetallic element further having connection to said driver on a driving axis spaced from said shaft axis; and means for varying the spacing of said driving and shaft axes without rotation of said bimetallic element comprising a rotatable mounting member interposed between one pair of the pairs of elements comprising said shaft and lever, said lever and bimetallic element, and said bimetallic element and driver; said mounting member being rotatable relative to said pair of elements between which it is interposed on respective, spaced and parallel axes.

3. A motion transmission mechanism for connection to a driver comprising: a rotatable lever; a bimetallic element responsive to temperature variation to bend in a plane; means for connecting a first point on the bimetallic element to the driver; and means for adjustably mounting the bimetallic element at a second point thereof on the lever including, a rotatable mounting element carried by the lever and rotatable relative to the lever on an axis parallel to the rotational axis of the lever, said bimetallic element being mounted on said rotatable mounting element and rotatable relatively thereto about an axis parallel to but spaced from the axis of rotation of the mounting element and extending through the bending plane of said bimetallic element.

References Cited in the file of this patent

UNITED STATES PATENTS

| | | |
|---|---|---|
| 2,178,799 | Loen | Nov. 7, 1939 |
| 2,194,624 | Titterington | Mar. 26, 1940 |

FOREIGN PATENTS

| | | |
|---|---|---|
| 723,655 | Germany | Aug. 7, 1942 |